(12) United States Patent
Agostinelli et al.

(10) Patent No.: US 6,550,918 B1
(45) Date of Patent: Apr. 22, 2003

(54) MONOCENTRIC AUTOSTEREOSCOPIC VIEWING APPARATUS USING RESONANT FIBER-OPTIC IMAGE GENERATION

(75) Inventors: John A. Agostinelli, Rochester, NY (US); Joshua M. Cobb, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/101,291

(22) Filed: Mar. 19, 2002

(51) Int. Cl.$^7$ ............................................. H01L 27/00
(52) U.S. Cl. ............................................. 353/7; 353/10
(58) Field of Search ..................... 353/7, 10; 349/15; 359/462, 464, 471, 472, 475, 477

(56) References Cited

U.S. PATENT DOCUMENTS

| | | |
|---|---|---|
| 3,748,015 A | 7/1973 | Offner |
| 4,124,978 A | 11/1978 | Wagner |
| 4,331,390 A | 5/1982 | Shafer |
| 4,526,439 A * | 7/1985 | Okoshi et al. ............... 359/458 |
| 4,854,688 A | 8/1989 | Hayford et al. |
| 5,206,499 A | 4/1993 | Mantravadi et al. |
| 5,255,028 A | 10/1993 | Biles |
| 5,319,968 A | 6/1994 | Billing-Ross et al. |
| 5,572,229 A | 11/1996 | Fisher |
| 5,572,363 A | 11/1996 | Fergason |
| 5,629,806 A | 5/1997 | Fergason |
| 5,671,992 A | 9/1997 | Richards |
| 5,908,300 A | 6/1999 | Walker et al. |
| 5,940,564 A | 8/1999 | Jewell |
| 6,034,717 A | 3/2000 | Dentinger et al. |
| 6,294,775 B1 | 9/2001 | Seibel et al. |
| 6,416,181 B1 * | 7/2002 | Kessler et al. ............... 353/7 |
| 2002/0075452 A1 * | 6/2002 | Kessler et al. ............... 353/7 |

OTHER PUBLICATIONS

G.J. Kintz; Autostereoscopic Properties of Spherical Panoramic Virtual Displays; SID 99 Digest, pp. 1000–1003.
S.A. Bento, T.E. Slowe, A.B. Kropp, and S.L. Smith; Micropolarizer–Based Multiple–Viewer Autostereoscopic Display; SPIE Proc. vol. 3639 Stereoscopic Displays and Virtual Reality Systems VI (SPIE, Jan. 1999) pp. 1–8.
W. Smith; Modern Optical Engineering; pp. 43–45.
E. Seibel, Q. Smithwick, C. Brown, and P. Reinhall; Single Fiber Flexible Endocope: General Design for Small Size, High Resolution, and Wide Field of View; Bimonitoring and Endoscopy Technologies, pp. 29–39.

* cited by examiner

Primary Examiner—William Dowling
(74) Attorney, Agent, or Firm—Nelson Adrian Blish (57) ABSTRACT

A substantially monocentric arrangement of optical components provides stereoscopic display of a real image, electronically scanned by resonant actuation of a resonant fiber scanner (137) using a flexible optical waveguide and projected toward a curved retro-reflective surface (124). To form each left and right intermediate image component, separate left and right image generation systems (70) each comprise a resonant fiber scanner (137) that itself comprises a resonant cantilever portion (139) of optical fiber (138) that directs a modulated beam in a curved pattern for projection, such as by a ball lens assembly (30). A monocentric arrangement of optical components images the left and right ball lens pupil at the corresponding left and right viewing pupil (14) of the observer (12) and essentially provides a single center of curvature for projection components. Use of such a monocentric arrangement provides an exceptionally wide field of view with large viewing pupils (14).

46 Claims, 4 Drawing Sheets

MONOCENTRIC AUTOSTEREOSCOPIC VIEWING APPARATUS USING RESONANT FIBER-OPTIC IMAGE GENERATION

CROSS REFERENCE TO RELATED APPLICATIONS

Reference is made to commonly-assigned copending U.S. patent application Ser. No. 09/738,747, filed Dec. 15, 2000, entitled A MONOCENTRIC AUTOSTEREOSCOPIC OPTICAL APPARATUS AND METHOD, by Kessler et al.; U.S. patent application Ser. No. 09/854,699, filed May 14, 2001, entitled ADAPTIVE AUTOSTEREOSCOPIC DISPLAY SYSTEM, by Covannon et al.; U.S. patent application Ser. No. 10/010,500, filed Nov. 13, 2001, entitled A MONOCENTRIC AUTOSTEREOSCOPIC OPTICAL APPARATUS USING A SCANNED LINEAR IMAGE SOURCE, by Agostinelli et al.; and U.S. patent application Ser. No. 10/095,341, filed Mar. 8, 2002, entitled A MONOCENTRIC AUTOSTEREOSCOPIC OPTICAL APPARATUS USING RESONANT FIBER-OPTIC IMAGE GENERATION, by Agostinelli et al., the disclosures of which are incorporated herein.

FIELD OF THE INVENTION

This invention generally relates to autostereoscopic display systems for viewing electronically generated images and more particularly relates to an apparatus and method for generating left- and right-eye images using a resonant fiber-optic member to form an image, with a monocentric arrangement of optical components including a retro-reflective surface to provide a very wide field of view and large exit pupils.

BACKGROUND OF THE INVENTION

The potential value of autostereoscopic display systems is widely appreciated particularly in entertainment and simulation fields. Autostereoscopic display systems include "immersion" systems, intended to provide a realistic viewing experience for an observer by visually surrounding the observer with a three-dimensional (3-D) image having a very wide field of view. As differentiated from the larger group of stereoscopic displays that include it, the autostereoscopic display is characterized by the absence of any requirement for a wearable item of any type, such as goggles, headgear, or special glasses, for example. That is, an autostereoscopic display attempts to provide "natural" viewing conditions for an observer.

In an article in *SID 99 Digest*, "Autostereoscopic Properties of Spherical Panoramic Virtual Displays", G. J. Kintz discloses one approach to providing autostereoscopic display with a wide field of view. Using the Kintz approach, no glasses or headgear are required. However, the observer's head must be positioned within a rapidly rotating spherical shell having arrays of light emitting diodes (LEDs), imaged by a monocentric mirror, to form a collimated virtual image. While the Kintz design provides one solution for a truly autostereoscopic system having a wide field of view, this design has considerable drawbacks. Among the disadvantages of the Kintz design is the requirement that the observer's head be in close proximity to a rapidly spinning surface. Such an approach requires measures to minimize the likelihood of accident and injury from contact with components on the spinning surface. Even with protective shielding, proximity to a rapidly moving surface could, at the least, cause the observer some apprehension. In addition, use of such a system imposes considerable constraints on head movement.

One class of autostereoscopic systems that operates by imaging the exit pupils of a pair of projectors onto the eyes of an observer is as outlined in an article by S. A. Benton, T. E. Slowe, A. B. Kropp, and S. L. Smith ("Micropolarizer-based multiple-viewer autostereoscopic display", in *Stereoscopic Displays and Virtual Reality Systems VI*, SPIE, January, 1999). Pupil imaging, as outlined by Benton in the above-mentioned article, can be implemented using large lenses or mirrors. An observer whose eyes are coincident with the imaged pupils can view a stereoscopic scene without crosstalk, without wearing eyewear of any kind.

It can be readily appreciated that the value and realistic quality of the viewing experience provided by an autostereoscopic display system using pupil imaging is enhanced by presenting the 3-D image with a wide field of view and large exit pupil. Such a system is most effective for immersive viewing functions if it allows an observer to be comfortably seated, without constraining head movement to within a tight tolerance and without requiring the observer to wear goggles or other devices. For fully satisfactory 3-D viewing, such a system should provide separate, high-resolution images to right and left eyes. It can also be readily appreciated that such a system is most favorably designed for compactness, to create an illusion of depth and width of field, while occupying as little actual floor space and volume as is possible. For the most realistic viewing experience, the observer should be presented with a virtual image, disposed to appear a large distance away.

An example of a conventional autostereoscopic display unit is disclosed in U.S. Pat. No. 5,671,992 (Richards), at which a seated observer experiences apparent 3-D visual effects created using images generated from separate projectors, one for each eye, and directed to the observer using an imaging system comprising a number of mirrors and a retro-reflective surface. The apparatus disclosed in U.S. Pat. No. 5,671,992 does not provide a wide-field of view, however, which would be advantageous for immersive autostereoscopic display, as noted above.

Other uses of retro-reflective surfaces for autostereoscopic imaging are disclosed in U.S. Pat. Nos. 5,572,363 and 5,629,806 (both to Fergason). The Fergason patents disclose in-line and folded optical path arrangements using a retro-reflective surface and beamsplitter that cooperate to enlarge an image projected from a relatively small image source in order to provide, at a viewing pupil, a real image formed on the retro-reflective surface of the device. In the approach disclosed in the Fergason patents, the viewing pupil is a pseudo-image of the exit pupil of the projection lens. A large viewing pupil with wide field of view are preferred for ease of viewing; however, in order to form a large viewing pupil using conventional wide-field lenses, the apparatus disclosed in U.S. Pat. Nos. 5,572,363 or 5,629,806 requires a low-gain retro-reflective screen. But such low-gain retro-reflective screens have disadvantages including reduced brightness and, due to gain profile characteristics, increased crosstalk between left- and right-eye images. Constrained by the need to provide a large viewing pupil given a small projector lens exit pupil, then, devices using low-gain retro-reflective surfaces tend to compromise on image quality. As was a drawback of the apparatus using a retro-reflective surface disclosed in U.S. Pat. No. 5,671,992, the apparatus disclosed in U.S. Pat. Nos. 5,572,363 and 5,629,806 do not provide wide field of view.

Conventional solutions for stereoscopic imaging have addressed some of the challenges for inexpensively providing wide field of view with high brightness, but there is room for improvement. For example, some early stereoscopic systems employed special headwear, goggles, or eyeglasses to provide the 3-D viewing experience. As just one example of such a system, U.S. Pat. No. 6,034,717 (Dentinger et al.) discloses a projection display system requiring an observer to wear a set of passive polarizing glasses in order to selectively direct the appropriate image to each eye for creating a 3-D effect.

Certainly, there are some situations for which headgear of some kind can be considered appropriate for stereoscopic viewing, such as with specific simulation applications. For such an application, U.S. Pat. No. 5,572,229 (Fisher) discloses a projection display headgear that provides stereoscopic viewing with a wide field of view. However, where possible, there are advantages to providing autostereoscopic viewing, in which an observer is not required to wear any type of device, as was disclosed in the device of U.S. Pat. No. 5,671,992. It would also be advantageous to allow some degree of freedom for head movement. In contrast, U.S. Pat. No. 5,908,300 (Walker et al.) discloses a hang-gliding simulation system in which an observer's head is maintained in a fixed position. While such a solution may be tolerable in the limited simulation environment disclosed in the Walker et al. patent, and may simplify the overall optical design of an apparatus, constraint of head movement would be a disadvantage in an immersion system. Notably, the system disclosed in the Walker et al. patent employs a narrow viewing aperture, effectively limiting the field of view. Complex, conventional projection lenses, disposed in an off-axis orientation, are employed in the device disclosed in U.S. Pat. No. 5,908,300, with scaling used to obtain the desired exit pupil size.

A number of systems have been developed to provide stereoscopic effects by presenting to the observer the combined image, through a beamsplitter, of two screens at two different distances from the observer, thereby creating the illusion of stereoscopic imaging, as is disclosed in U.S. Pat. No. 5,255,028 (Biles). However, this type of system is limited to small viewing angles and is, therefore, not suitable for providing an immersive viewing experience.

From an optical perspective, it can be seen that there would be advantages to autostereoscopic design using pupil imaging. A system designed for pupil imaging must provide separate images to the left and right pupils correspondingly and provide the most natural viewing conditions, eliminating any need for goggles or special headgear. In addition, it would be advantageous for such a system to provide the largest possible viewing pupils to the observer, so as to allow some freedom of movement, to maintain the necessary image brightness, and to provide an ultra-wide field of view. It is recognized in the optical arts that while an ideal autostereoscopic imaging system must meet these requirements in order to provide a more fully satisfactory and realistic viewing experience, satisfying all of these requirements can be difficult to achieve. In addition, such a system must provide sufficient resolution for realistic imaging, with acceptable contrast. Moreover, physical constraints for small system footprint and dimensional constraints for acceptable interocular separation must be considered, so that separate images directed to each eye can be advantageously spaced and correctly separated for viewing. It is instructive to note that interocular distance constraints limit the ability to achieve larger pupil diameter at a given ultrawide field by simply scaling the projection lens.

Monocentric imaging systems have been shown to provide significant advantages for high-resolution imaging of flat objects, such as is disclosed in U.S. Pat. No. 3,748,015 (Offner), which teaches an arrangement of spherical mirrors arranged with coincident centers of curvature in an imaging system designed for unit magnification. The monocentric arrangement disclosed in the Offner patent minimizes a number of types of image aberration and is conceptually straightforward, allowing a simplified optical design for high-resolution catoptric imaging systems. A monocentric arrangement of mirrors and lenses is also known to provide advantages for telescopic systems having wide field of view, as is disclosed in U.S. Pat. No. 4,331,390 (Shafer). However, while the advantages of monocentric design for overall simplicity and for minimizing distortion and optical aberrations can be appreciated, such a design concept can be difficult to implement in an immersion system requiring wide field of view and large exit pupil with a reasonably small overall footprint. Moreover, a fully monocentric design would not meet the requirement for full stereoscopic imaging, since an imaging system providing stereoscopic effects must present separate images for left and right pupils.

As is disclosed in U.S. Pat. No. 5,908,300, conventional wide-field projection lenses can be employed as projection lenses in a pupil-imaging autostereoscopic display. However, there are a number of disadvantages with conventional approaches. As was noted earlier with respect to U.S. Pat. Nos. 5,572,363 and 5,629,806, the relatively small exit pupil size of conventional projection lenses can be a limitation with negative impact on the design and performance of autostereoscopic display systems using retro-reflective surfaces. Wide-angle lens systems, capable of angular fields such as would be needed for effective immersion viewing, would be very complex and costly. Typical wide angle lenses for large-format cameras, such as the Biogon™ lens manufactured by Carl-Zeiss-Stiftung in Jena, Germany for example, are capable of 75-degree angular fields. The Biogon lens consists of seven component lenses and is more than 80 mm in diameter, while only providing a pupil size of 10 mm. For larger pupil size, the lens needs to be scaled in size, however, the large diameter of such a lens body presents a significant design difficulty for an autostereoscopic immersion system, relative to the interocular distance at the viewing position. Costly cutting of lenses so that right- and left-eye assemblies could be disposed side-by-side, thereby achieving a pair of lens pupils spaced consistently with human interocular separation, presents difficult manufacturing problems. Interocular distance limitations constrain the spatial positioning of projection apparatus for each eye and preclude scaling of pupil size by simple scaling of the lens. Moreover, an effective immersion system most advantageously allows a very wide field of view, preferably well in excess of 90 degrees, and would provide large exit pupil diameters, preferably larger than 20 mm.

As an alternative for large field of view applications, ball lenses have been employed for specialized optical functions, particularly miniaturized ball lenses for use in fiber optics coupling and transmission applications, such as is disclosed in U.S. Pat. No. 5,940,564 (Jewell) which discloses advantageous use of a miniature ball lens within a coupling device. On a larger scale, ball lenses can be utilized within an astronomical tracking device, as is disclosed in U.S. Pat. No. 5,206,499 (Mantravadi et al.) In the Mantravadi et al. patent, the ball lens is employed because it allows a wide field of view, greater than 60 degrees, with minimal off-axis aberrations or distortions. In particular, the absence of a unique optical axis is used advantageously, so that every principal ray that passes through the ball lens can be considered to define its own optical axis. Because of its low illumination falloff relative to angular changes of incident light, a single ball lens is favorably used to direct light from space to a plurality of sensors in this application. Notably, photosensors at the output of the ball lens are disposed along a curved focal plane.

The benefits of a spherical or ball lens for wide angle imaging are also utilized in an apparatus for determining space-craft attitude, as is disclosed in U.S. Pat. No. 5,319,968 (Billing-Ross et al.) Here, an array of mirrors direct light rays through a ball lens. The shape of this lens is advantageous since beams which pass through the lens are at normal incidence to the image surface. The light rays are thus refracted toward the center of the lens, resulting in an imaging system having a wide field of view.

Another specialized use of ball lens characteristics is disclosed in U.S. Pat. No. 4,854,688 (Hayford et al.) In the optical arrangement of the Hayford et al. patent, directed to the transmission of a CRT-generated 2-dimensional image along a non-linear path, such as attached to headgear for a pilot, a ball lens directs a collimated input image, optically at infinity, for a pilot's view.

Another use for wide-angle viewing capabilities of a ball lens is disclosed in U.S. Pat. No. 4,124,978 (Thompson), which teaches use of a ball lens as part of an objective lens in binocular optics for night viewing.

U.S. Pat. Nos. 4,124,978 and 4,854,688 described above that the use of a ball lens in image projection, there are suggestions of the overall capability of the ball lens to provide, in conjunction with support optics, wide field of view imaging. However, there are substantial problems that must be overcome in order to make effective use of such devices for immersive imaging applications, particularly where an image is electronically processed to be projected. For example, conventional electronic image presentation techniques, using devices such as spatial light modulators, provide an image on a flat surface. Ball lens performance with flat field imaging would be extremely poor.

There are also other basic optical limitations for immersion systems that must be addressed with any type of optical projection that provides a wide field of view. An important limitation is imposed by the LaGrange invariant. Any imaging system conforms to the LaGrange invariant, whereby the product of pupil size and semi-field angle is equal to the product of the image size and the numerical aperture and is an invariant for the optical system. This can be a limitation when using, as an image generator, a relatively small spatial light modulator or similar pixel array which can operate over a relatively small numerical aperture since the LaGrange value associated with the device is small. A monocentric imaging system, however, providing a large field of view with a large pupil size (that is, a large numerical aperture), inherently has a large LaGrange value. Thus, when this monocentric imaging system is used with a spatial light modulator having a small LaGrange value, either the field or the aperture of the imaging system, or both, will be underfilled due to such a mismatch of LaGrange values. For a detailed description of the LaGrange invariant, reference is made to *Modern Optical Engineering, The Design of Optical Systems* by Warren J. Smith, published by McGraw-Hill, Inc., pages 42–45.

Copending U.S. patent application Ser. Nos. 09/738,747 and 09/854,699 take advantage of capabilities for wide field of view projection using a ball lens in an autostereoscopic imaging system. In both of these copending applications, the source image that is provided to the projecting ball lens for each eye is presented as a complete two-dimensional image, presented on a surface. The image source disclosed in the preferred embodiment of each of these applications is a two-dimensional array, such as an LCD, a DMD, or similar device. The image source could alternately be a CRT which, even though generated by a scanned electron beam, presents a complete two-dimensional image to ball lens projection optics.

It can be appreciated by those skilled in the optical arts that a high brightness image source would be most advantageous for wide-field autostereoscopic imaging. However, in order to achieve suitable brightness levels for conventional autostereoscopic systems, LCD or DMD-based systems require complex and costly apparatus. CRT and OLED technologies, meanwhile, do not provide solutions that offer high brightness for wide-field autostereoscopic imaging. Thus, there is a recognized need for a simple, low cost, high-brightness image source that is well-suited to autostereoscopic imaging apparatus.

Resonant fiber optic scanning has been proposed for use in diagnostic instrumentation, such as in endoscopic equipment, for example. An article by Eric J Seibel, Quinn Y. J. Smithwick, Chris M. Brown, and Per G. Reinhall, entitled "Single fiber endoscope: general design for small size, high resolution, and wide field of view" in *Proceedings of SPIE*, Vol. 4158 (2001) pp. 29–39, describes the use of a vibrating, flexible optical fiber in 2-D scanning applications, where scanning is used for an input sensing function. When actuated at resonant frequency, a fiber optic element can be controllably scanned over an area to trace out a given regular pattern in a periodic fashion. Using this capability, U.S. Pat. No. 6,294,775 (Seibel et al.) discloses methods for controlled deflection of a flexible optical fiber as a scanning component in an image acquisition system.

While resonant fiber scanning is being employed for image acquisition functions, as noted in the above article and in U.S. Pat. No. 6,294,775, there may also be as yet unexploited advantages in using this technology for image formation, such as in image projection apparatus.

To take advantage of the benefits of resonant fiber scanning in an autostereoscopic display apparatus, copending U.S. patent application Ser. No. 10/095,341 discloses a two-dimensional image source that provides an intermediate image by scanning an optical fiber in a scan pattern synchronous with modulation of light emitted from the fiber. The apparatus disclosed in this copending U.S. Patent application employs a curved mirror for forming a virtual image of this intermediate image. This approach provides high brightness levels in a simple image generation system. However, there are advantages in alternative approaches that eliminate the cost of the curved mirror.

Thus it can be seen that, while there are some conventional approaches that meet some of the requirements for autostereoscopic imaging, there is room for improvement. There is particular interest in improved designs that maximize image brightness, minimize image aberrations, reduce constraints on viewer movement, and provide high-quality, high-resolution virtual images for pupil imaging with large viewing pupil sizes. In particular, solutions that reduce the number of components and minimize component cost and complexity are seen to be advantageous.

SUMMARY OF THE INVENTION

It is an object of the present invention to provide a substantially monocentric autostereoscopic optical apparatus for displaying a stereoscopic real image.

Briefly, according to one aspect of the present invention, a monocentric autostereoscopic viewing apparatus comprises a left image to be viewed by an observer at a left viewing pupil and a right image to be viewed by the observer at a right viewing pupil, the apparatus comprising:

(a) a left image generation system and, similarly constructed, a right image generation system, wherein each left and right image generation system forms a first intermediate curved image comprising an array of image pixels, with each image generation system comprising:

(a1) a light source for emitting modulated light corresponding to a series of image pixels arranged according to a scan pattern;

(a2) an optical waveguide having an input end coupled to the light source and a flexible output end for deflection, the output end emitting the modulated light;

(a3) an actuator for deflecting the flexible output end of the optical waveguide according to the scan pattern;

(a4) a curved surface for forming the first intermediate curved image thereon by receiving the modulated light emitted from the output end of the optical waveguide as deflected by the actuator according to the scan pattern;

(a5) an optical relay element for relaying, onto the curved surface, the modulated light emitted from the flexible output end of the optical waveguide according to the scan pattern, forming the first intermediate curved image thereby;

(b) a left ball lens assembly for projecting the first intermediate curved image from the left image generation system, the left ball lens assembly having a left ball lens pupil;

(c) a right ball lens assembly for projecting the first intermediate curved image from the right image generation system, the right ball lens assembly having a right ball lens pupil;

(d) a retro-reflective surface disposed to form, in cooperation with a beamsplitter, a pseudo-image of the left ball lens pupil at the left viewing pupil and to form a pseudo-image of the right ball lens pupil at the right viewing pupil; and the stereoscopic real image formed on the retro-reflective surface from the first intermediate curved image from the left image generation system and from the first intermediate curved image from the right image generation system.

A feature of the present invention is the use of a monocentric arrangement of optical components, thus simplifying design, minimizing aberrations and providing a wide field of view with large exit pupils.

A further feature of the present invention is the use of a resonant fiber optic image source for providing a scanned intermediate image.

A further feature of the present invention is that it allows a number of configurations, including configurations that minimize the number of optical components required, even including configurations that can function without a ball lens assembly.

It is an advantage of the present invention is that it eliminates the need for a higher cost two-dimensional surface as image source, replacing this with a lower cost scanned resonant fiber optic source.

It is a further advantage of the present invention that it allows use of inexpensive, bright light sources for generating an intermediate image for projection.

It is a further advantage of the present invention that it provides a compact arrangement of optical components, capable of being packaged in a display system having a small footprint.

It is a further advantage of the present invention that it allows high-resolution stereoscopic electronic imaging with high brightness and high contrast, with a very wide field of view. The present invention provides a system that is very light-efficient, capable of providing high brightness levels for projection.

It is a further advantage of the present invention that it provides a solution for wide field stereoscopic projection that is inexpensive when compared with the cost of conventional projection lens systems.

It is a further advantage of the present invention that it provides stereoscopic viewing without requiring an observer to wear goggles or other device.

It is yet a further advantage of the present invention that it provides an enlarged viewing pupil of sufficient size for non-critical alignment of an observer in relation to the display.

It is yet a further advantage of the present invention that it minimizes image aberration by projecting an image formed with an inherent curvature onto a curved surface.

It is yet a further advantage of the present invention that it provides uniform illumination across the full field of view.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
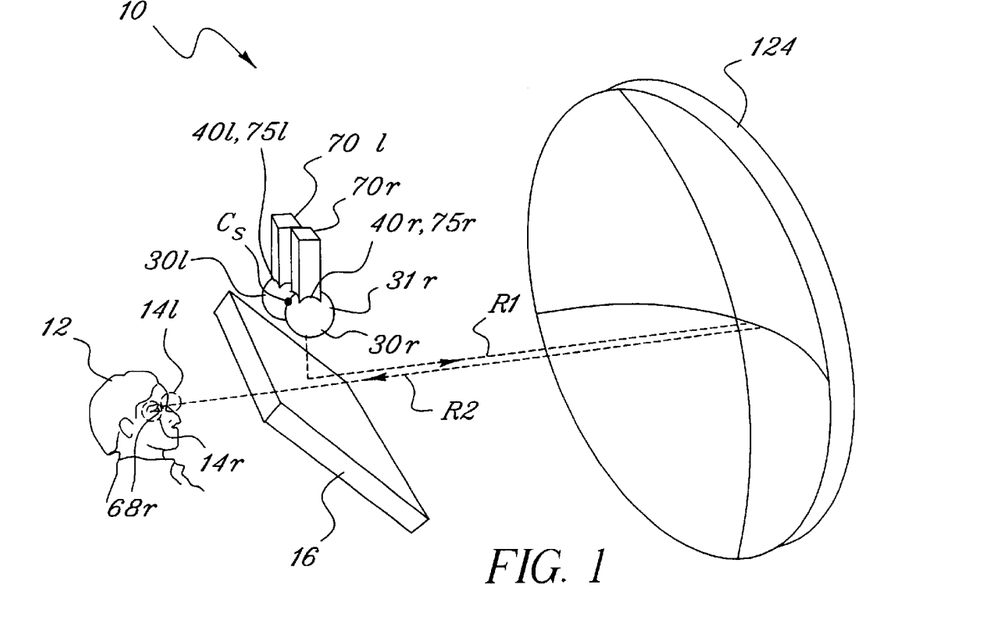
FIG. 1 is a perspective view showing key components of the apparatus of the present invention in an autostereoscopic imaging system.
Figure 2:
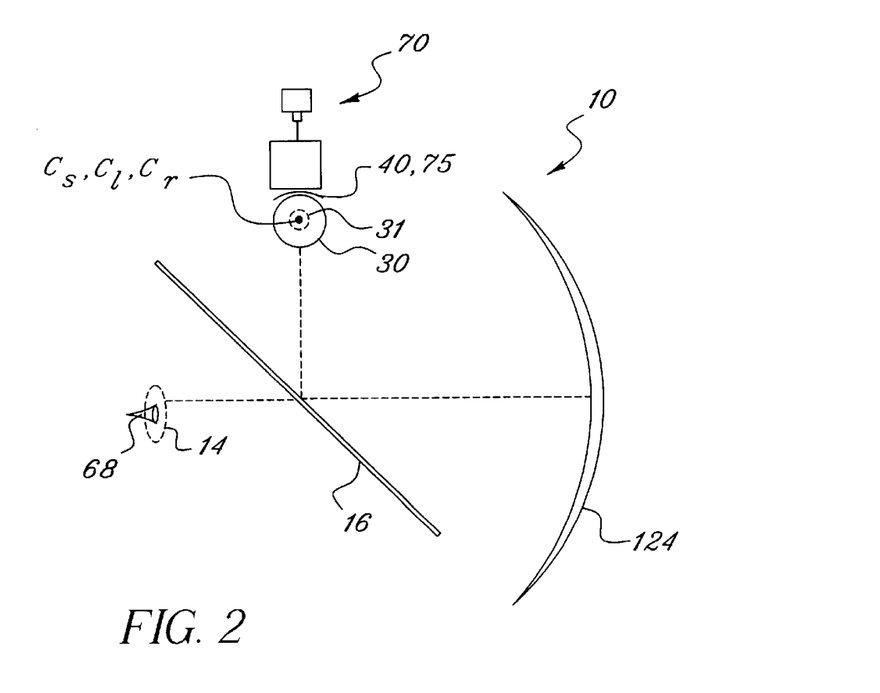
FIG. 2 is a side schematic view showing the substantially concentric arrangement of projection optics in a preferred embodiment.
Figure 3:
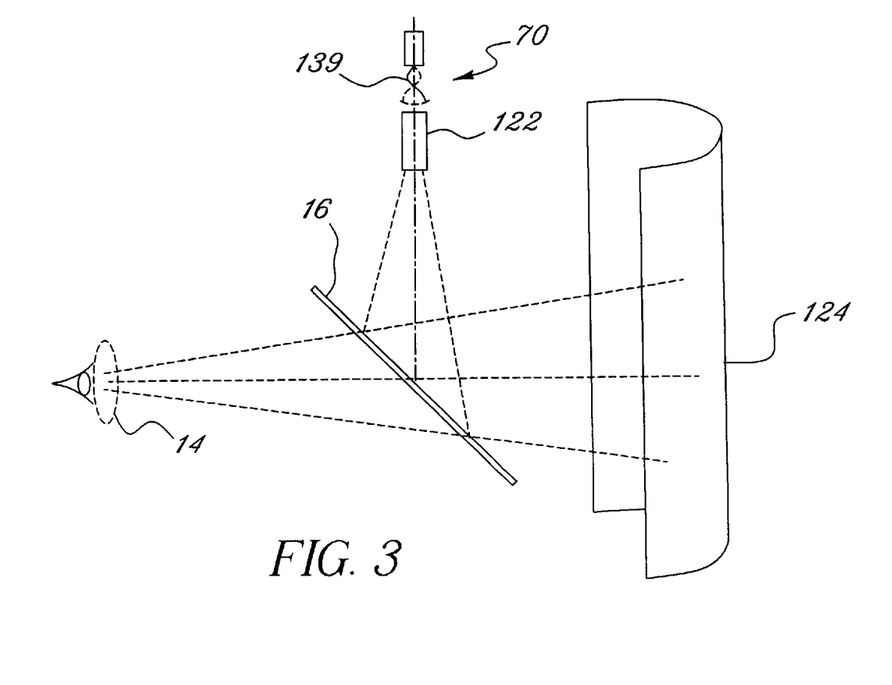
FIG. 3 is a side schematic view showing the substantially concentric arrangement of projection optics in an alternate embodiment.

Referring to FIGS. 1, 2, and 3, the description that follows primarily focuses on the optical components that direct light to either one of viewing pupils 14*l* and 14*r*. It should be emphasized, as was just described above, that similar optical components are employed for left image generation system 70*l* and for right image generation system 70*r* and, overall, for both left and right optical paths. For clarity wherever possible, the description that follows applies equally to components in both right and left optical paths. Any distinction between right and left optical paths is made only when it is necessary to be precise. (Appended left "l" or right "r" designators for part numbers are, for this reason, omitted from subsequent description unless needed.)

Referring to FIG. 1, there is shown a perspective view of an autostereoscopic imaging system 10. An observer 12 is typically seated in position to view a real stereoscopic image from left and right viewing pupils 14*l* and 14*r*. Optimal viewing conditions are obtained when left and right eye pupils 68*l* (not visible in the view of FIG. 1) and 68*r* of observer 12 are coincident with the position of corresponding left and right viewing pupils 14*l* and 14*r*.

A left image generation system 70*l* and a right image generation system 70*r* operate jointly to provide the real image for stereoscopic viewing. Both left and right image generation systems 70*l* and 70*r* operate and interact with other elements of autostereoscopic imaging system 10 similarly; for simplicity, the right optical path is described and is traced by the dashed line in FIG. 1 which shows outgoing rays R1, reflected from a beamsplitter 16 and, in the opposite direction, retro-reflected rays R2 transmitted through beamsplitter 16. Each image generation system 70 generates, on a curved surface 40, a first intermediate curved image 75 for a ball lens assembly 30. Ball lens assembly 30 projects first intermediate curved image 75, which is reflected from beamsplitter 16 onto curved retro-reflective surface 124. Retro-reflected rays R2 from surface 124 form a pseudo-image of each ball lens pupil 31 at each corresponding viewing pupil 14. This same imaging function occurs for both left and right viewing pupils 14*l* and 14*r*, with the appropriate components in each imaging path. In the preferred embodiment, retro-reflective surface 124 is substantially spherical, with a center of curvature between left and right ball lens assemblies 30*l* and 30*r*.

It is instructive to observe that, due to the retro-reflective behavior of surface 124, the image-like distribution of light corresponding to ball lens pupil 31 at viewing pupil 14 is neither a real image nor a virtual image as these types of image are formally defined for an image-forming optical component. Rather, this image is considered to be a pseudo-image of ball lens pupil 31, formed as an artifact of retro-reflective screen behavior and geometry.

FIG. 1 illustrates some of the key problems to be solved, from an optical design perspective, and shows an overview of the solution provided by the present invention and its advantages. It is instructive to review key design considerations for achieving the most life-like stereoscopic viewing. A first consideration is field of view. In order to provide observer 12 with an effective immersion experience, a wide field of view is important, in excess of that available using prior art techniques. As a design goal, autostereoscopic imaging system 10 of the present invention is intended to provide a field of view of at least 90 degrees.

Another consideration relates to viewing pupil 14 dimensions. In order to be used comfortably by observer 12, viewing pupils 14*l*, 14*r* must be sufficiently large. Recalling the background description given above, prior art methods, hampered by the relatively small exit pupils of projection optics, achieve large viewing pupils 14*l*, 14*r* by choosing a low-gain screen material for retro-reflective surface 124. One type of low-gain retro-reflective material, Scotchlite™ materials available from Minnesota Mining and Manufacturing Co., St. Paul, Minn., essentially uses numerous tiny glass beads as retro-reflecting lenses. However, low-gain retro-reflective materials allow some spreading of retro-reflected rays, with corresponding loss of brightness. With reference to FIG. 1, this approach would enlarge the size of the pseudo-image of ball lens pupil 31 at viewing pupil 14, but the resulting blurring of viewing pupils 14*l* and 14*r* would cause left-eye/right-eye crosstalk and loss of brightness. In contrast to conventional projection optics, however, ball lens pupil 31 of the present invention provides a relatively large exit pupil. Because of this larger exit pupil size, high-gain retro-reflective materials can be used for retro-reflective surface 124. High-gain retro-reflective materials include sheets that incorporate cube-corner microprism reflectors, such as those available from Reflexite Corporation, New Britain, CT. The use of high-gain retro-reflective materials provides advantages such as minimized crosstalk and improved brightness.

Yet another consideration relates to interocular separation. To provide a viewable stereoscopic virtual image over a range of human interocular separations, ball lens assemblies 30*l* and 30*r* are advantageously separated by an appropriate, empirically determined interaxial distance. Alternately, the interaxial distance between scanning ball lens assemblies 30*l* and 30*r* could be manually adjusted to suit interocular dimensions of observer 12 or could be automatically sensed and adjusted by autostereoscopic imaging system 10. Components of left and right image generation systems 70*l* and 70*r* and their corresponding left and right ball lens assemblies 30*l* and 30*r* could be mounted on a boom, for example, allowing movement of each image generation system 70*l* and 70*r* relative to the other in order to compensate for interocular distance differences. Reference is made to commonly-assigned U.S. patent application Ser. No. 09/854,699, which describes automated sensing and adjustment of left- and right-eye projection assemblies using ball lenses. The same feedback loop apparatus and methods disclosed in this earlier application could also be applied for corresponding apparatus in the present invention.

Monocentric Design of Image Path

The substantially monocentric arrangement of optical components in the apparatus of the present invention provides a number of additional advantages for minimizing image aberrations and for maximizing field of view. Referring to FIG. 2, there is shown, from a side view, the optically concentric relationship of key components in the optical path, in folded form, applicable for both left and right image paths. As was noted with respect to FIG. 1, the center of curvature of retro-reflective surface 124 is $C_s$, optically located midway between left and right ball lens assemblies 30*l* and 30*r*. In the general scheme shown in FIG. 2, curved surface 40 is preferably curved so that its center of its radius of curvature is as close as possible to center $C_l$ or $C_r$ of ball lens assembly 30. This concentric arrangement enables ball lens assembly 30, in cooperation with beamsplitter 16, to project an image onto retro-reflective surface 124 having the same center of curvature $C_l$ or $C_r$ as ball lens assembly 30.

It is instructive to observe that FIG. 2 gives a generalized, first approximation of the relationship of components in the folded optical path. The actual position of the center of curvature of curved mirror, labeled $C_s$ in FIG. 2, is midway between the centers of curvature of left and right scanning ball lens assemblies 30*l* and 30*r*, labeled $C_l$ and $C_r$ respectively, but not separately visible from the side view in FIG. 2. Because there are separate left and right scanning ball lens assemblies 30*l* and 30*r*, and, correspondingly, an interocular distance between left and right human eye pupils 68*l* and 68*r* of observer 12, a geometrically perfect monocentricity of optical components cannot be achieved. As a close approximation, substantial monocentricity is effected relative to center $C_s$ in FIG. 2. It is also instructive to observe that the ideal placement of left and right scanning ball lens assemblies 30*l* and 30*r* for observer 12 would be such that viewing pupils 14*l* and 14*r* are positioned suitably for each eye. As was described with reference to FIG. 1, viewing pupils 14*l* and 14*r* are pseudo-images of ball lens pupils 31*l* and 31*r*, formed by retro-reflective surface 124 and beam-splitter 16.

Because ball lens assembly 30 is spherical with center of curvature at center C, as the unfolded arrangement of FIG. 2 shows, a wide field of view can be provided, with minimal image aberration.

Operation of Ball Lens Assembly 30

Figure 4:
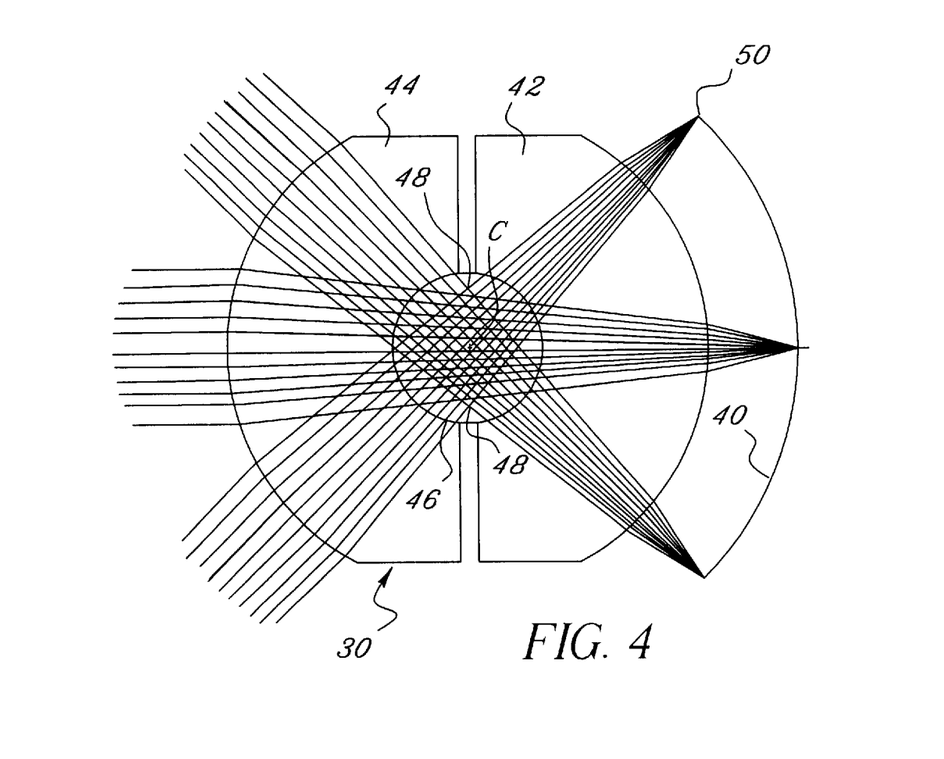
FIG. 4 is a cross-section view showing the composition of a ball lens assembly.

With the arrangement shown in FIGS. 1 and 2, ball lens assembly 30*l*, 30*r* functions as the projection lens for its associated left or right optical system. Referring to FIG. 4, there is shown the concentric arrangement provided for each ball lens assembly 30. A central spherical lens 46 is disposed between meniscus lenses 42 and 44, where meniscus lenses 42 and 44 have indices of refraction and other characteristics intended to minimize on-axis spherical and chromatic aberration, as is well known in the optical design arts. Stops 48 limit the entrance pupil within ball lens assembly 30. Stops 48 need not be physical, but may alternately be implemented using optical effects such as total internal reflection. In terms of the optics path, stops 48 serve to define an exit pupil for ball lens assembly 30.

In a preferred embodiment, meniscus lenses 42 and 44 are selected to reduce image aberration and to optimize image quality for the image projected toward the curved mirror. It must be noted that ball lens assembly 30 could comprise any number of arrangements of support lenses surrounding central spherical lens 46. Surfaces of these support lenses, however many are employed, would share a common center of curvature C with central spherical lens 46. Moreover, the refractive materials used for lens components of ball lens assembly 30 could be varied, within the scope of the present invention. For example, in addition to standard glass lenses, central spherical lens 46 could comprise a plastic, an oil or other liquid substance, or any other refractive material chosen for the requirements of the application. Meniscus lenses 42 and 44, and any other additional support lenses in ball lens assembly 30, could be made of glass, plastic, enclosed liquids, or other suitable refractive materials, all within the scope of the present invention. In its simplest embodiment, ball lens assembly 30 could comprise a single central spherical lens 46, without additional supporting refractive components.

Image Generation System 70

Figure 5:
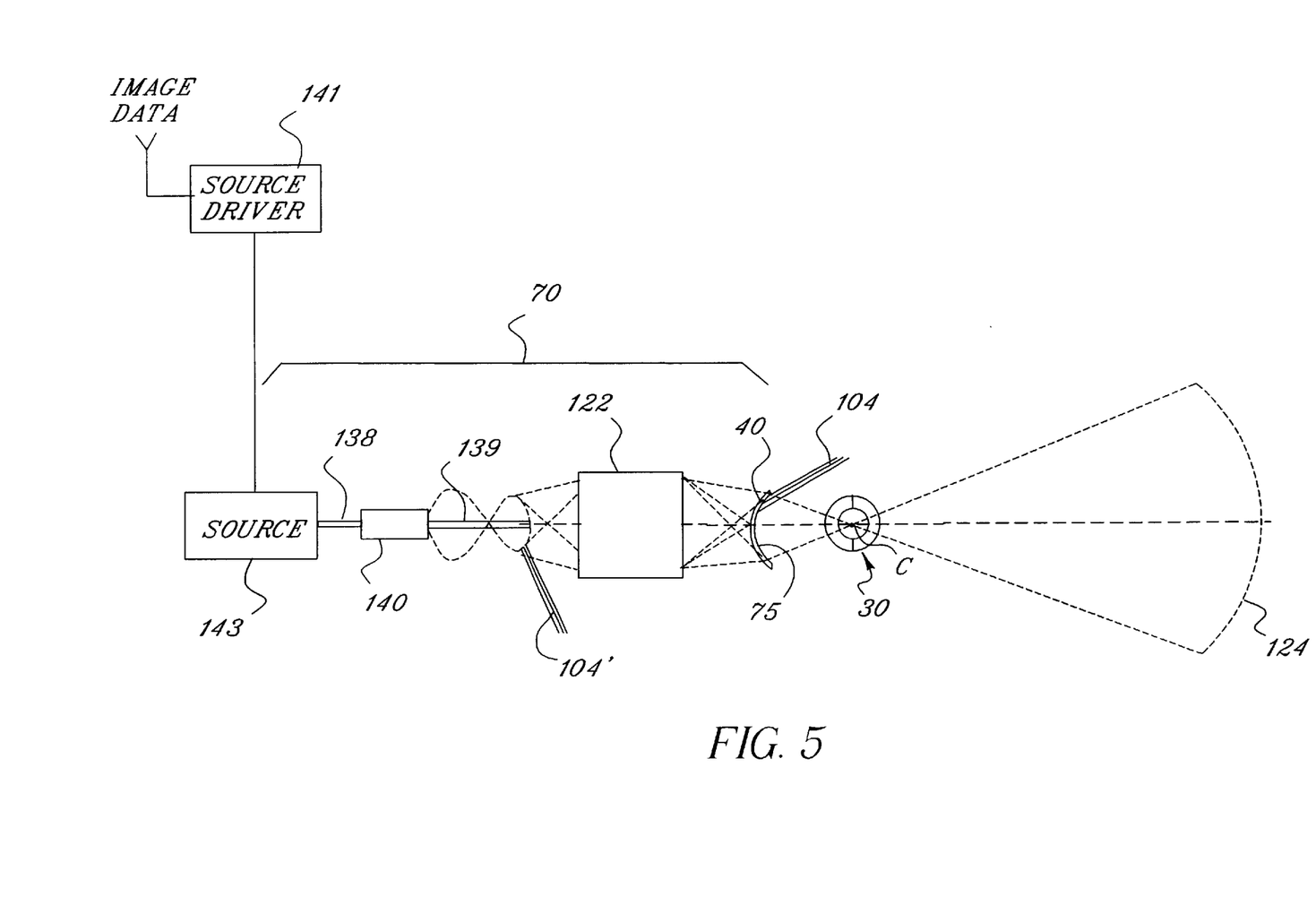
FIG. 5 is a schematic view showing image generation system components of the present invention.

Referring to FIG. 5, there is shown in more detail the arrangement of components of image generation system 70. Image data from a digital image source is input to a light source driver 141, which contains the logic control and drive electronics for modulating a light source 143. Light source 143 provides the modulated light signal used to form first intermediate curved image 75. Light source 143 is coupled to an optical fiber 138, which serves as an optical waveguide. Techniques for coupling light sources to optical fibers, well known in the optical arts, include butt-coupling and lens coupling, for example.

Light source 143 and optical fiber 138 cooperate with a resonant fiber scanner 137 and a relay lens assembly 122 to form first intermediate curved image 75. First intermediate curved image 75, comprising individual pixels 104, is formed on curved surface 40 for projection by ball lens assembly 30.

Resonant fiber scanner 137 comprises an end-portion of optical fiber 138 that acts as a resonant cantilever portion 139 and an actuator 140 that drives resonant cantilever portion 139 movement. Actuator 140 is itself controlled by drive signals that are synchronized with light source driver 141, which provides control signals to light source 143.

Relay lens assembly 122 acts as an optical relay element, forming each image pixel 104 in first intermediate curved image 75 from a corresponding scanner pixel 104' generated by the interaction of light source 143 and resonant fiber scanner 137. As part of this function, relay lens assembly 122 must provide the required field curvature to first intermediate curved image 75 on curved surface 40. As is shown in the schematic view of FIG. 5, relay lens assembly 122 may be required to relay an image from one curvature, formed by the action of resonant cantilever portion 139, to a second curvature, formed by curved surface 40. Thus, relay lens assembly 122 may comprise any number of lenses suitably configured for this purpose. As another alternative, relay lens assembly 122 may comprise a fiber optic faceplate, such as those manufactured by Incom, Inc., Charlton, Mass. for example, or fiber optic billet, close-coupled with the output end of resonant cantilever portion 139.

As is shown in FIG. 5, the output end of resonant cantilever portion 139 emits a single scanner pixel 104' at a time, acting as a point source that is modulated in a time-sequenced manner, to provide each image pixel 104 in a two-dimensioned image array of image pixels 104. Resonant fiber scanner 137 operates as is disclosed in the article entitled "Single fiber endoscope: general design for small size, high resolution, and wide field of view" by Eric J. Seibel, Quinn Y. J. Smithwick, Chris M. Brown, and G. Reinhall, in *Proceedings of SPIE*, Vol. 4158 (2001) pp. 29–39, cited above.

In the preferred embodiment, light source 143 is a laser that can be directly modulated. Actuator 140 could be any of a number of types of actuator adapted to provide the necessary resonant vibration to resonant cantilever portion 139. Examples of suitable types of actuator 140 include piezoelectric bimorph or piezoelectric tube actuators; such as piezoceramic tubes available from ValpeyFisher Corporation, located in Hopkinton, Mass. Other suitable actuators could be electromagnetic actuators including electrodynamic devices such as a voice coil, resonant scanners, micro-electro-mechanical structures (MEMS) actuators, galvanometers, electrostatic actuators; and mechanical actuators, such as one or more motors combined with eccentric cams, for example.

The scan pattern that actuator 140 imparts to the output end of resonant cantilever portion 139 can trace out the complete two-dimensional array of image pixels 140 in a number of ways. The most straightforward scan pattern would be the rectilinear scan pattern, such as the pattern conventionally employed for CRT electron beam scanning. However, other patterns are possible. For example, since the goal of image generation system 70 is to provide a curved image, there may be advantages in a scan pattern that is spiral in shape or that comprises concentric circles. Other scans, such as the propeller scan noted in the article cited above, might be advantages for some imaging conditions. It must be observed that the scan pattern used determines the sequencing of scanner pixels 104'.

Function and Configuration of Diffusive Curved Surface 40

In the preferred embodiment, curved surface 40 is a diffusive, curved surface having a center of curvature coincident with center of curvature C of ball lens assembly 30.

As is shown again in FIG. 5, ball lens assembly 30 projects first intermediate curved image 75 to form a second intermediate curved image.

The concentric arrangement with curved surface 40 and ball lens assembly 30 minimizes field aberrations and on-axis aberration for projection of the first left/right intermediate curved image 75l, 75r formed on curved surface 40. Referring back to FIG. 4, curved surface 40 can thus be considered as a myriad set of dispersive point sources 50, whose rays are received by ball lens assembly 30. By providing first intermediate curved image 75 on curved diffusive surface 40, LaGrange invariant constraints on exit pupil size and field angle are effectively overcome. In terms of components shown in FIG. 1, curved surface 40 acts as an interface to match the low LaGrange invariant that is characteristic of image generation system 70 with the higher LaGrange invariant of stereoscopic projection components, including ball lens assembly 30, beamsplitter 16, and retro-reflective surface 124. By overcoming LaGrange invariant constraints, the use of curved surface 40 thus allows wide-angle projection of the image by ball lens assembly 30.

The function of curved surface 40 is to diffuse the light relayed from relay lens assembly 122, but with as much brightness as possible, for projection at a wide image angle by ball lens assembly 30. To allow eventual viewing of the projected image by observer 12, it is important that each point source 50 effectively fill stop 48 of ball lens assembly 30. If this is achieved, observer 12, with eyes positioned at viewing pupils 14l, 14r, can view the entire projected image from any point within viewing pupils 14l, 14r.

In the preferred embodiment, curved surface 40 comprises a coating applied to a surface, such as applied to a lens. Suitable diffusive coatings and treatments for curved surface 40 are known to those skilled in the optical arts. Alternately, curved surface 40 could be ground, etched, or treated in some other way in order to provide the needed diffusive characteristics, as is well known in the optical arts.

In an alternate embodiment, diffusive curved surface 40 could be implemented using a fiber optic faceplate, such as those manufactured by Incom, Inc., Charlton, Mass. Typically used in flat panel display applications, fiber optic faceplates transfer an image from one surface to another. As part of curved surface 40, a fiber optic faceplate could have, for example, a double-concave shape for transferring the image relayed by relay lens assembly 122 from an arbitrary field curvature to a field curvature that is concentric with ball lens assembly 30. The output concave surface of such a fiber optic faceplate would act as curved surface 40 and could be treated using a number of techniques familiar to those skilled in the optical arts for enhancing the performance of a diffusive surface. Surface treatments could be achieved, for example, using various grinding, buffing, etching, or other techniques that result in a diffusive surface, or using a holographic grating, for example. A diffusive coating could alternately be applied to the output concave portion of curved surface 40.

It is instructive to note that the apparatus and method of the present invention allow the aspect ratio or corresponding dimensional measurement of first intermediate curved image 75 to be variable within a range by manipulating the scanning pattern of resonant fiber scanner 137 or by controlling the data timing for the imaging beam, or using some combination of scanning pattern and timing adjustment.

Options for Retro-reflective Surface 124 Arrangement

As described above, retro-reflective surface 124 cooperates with beamsplitter 16 to form a pseudo-image of ball lens pupil 31 at viewing pupil 14. Depending on the degree of retro-reflectivity of retro-reflective screen 124, the pseudo-image thus created may be varied in size, thereby allowing viewing pupils 14l and 14r to be enlarged or reduced for optimum viewing conditions. Enlargement of viewing pupils 14l and 14r, however, can reduce the brightness of the displayed image. In addition, care must be taken to minimize objectionable crosstalk between left and right viewing pupils 14l and 14r.

The substantially spherical curvature of retro-reflective surface 124 shown in FIGS. 1 and 2 is advantageous for maintaining optimum brightness. With spherical curvature, the angle of incident light is normal throughout the field of view. As incident angles deviate from normal, some fall-off of retro-reflected light intensity occurs.

Referring to FIG. 3, there is shown an alternate arrangement of optical components, in which retro-reflective surface 124 has cylindrical curvature, rather than the spherical curvature of the preferred embodiment. Using the arrangement of FIG. 3, no curved intermediate image 75 is created on surface 40; no ball lens assembly 30 is used for projection. Instead, relay lens 122 directs the light output from resonant cantilever portion 139 to beamsplitter 16 and toward retro-reflective surface 124. For this embodiment, the curvature of retro-reflective surface 124 must be carefully matched with the image curvature provided by relay lens 122.

In comparison with the ball lens optics arrangement of FIGS. 1 and 2, the optical configuration of FIG. 3 is somewhat less satisfactory. To compensate for the relatively small pupil size of relay lens 122, retro-reflective surface 124 must be provided with low gain in order to provide viewing pupil 14 at a usable size. As a result, there is some loss in image brightness. The cylindrical curvature of retro-reflective surface 124 shown in FIG. 3 is not as advantageous for light intensity as the spherical curvature shown in FIGS. 1 and 2; however, there could be some benefit obtained with this curvature in one dimension. For example, a cylindrical arrangement of retro-reflective surface 124 as shown in FIG. 3 could be acceptable where the vertical field is small enough so that the image remains reasonably in focus from top to bottom. In an extreme case, retro-reflective surface 124 could be substantially flat, but this would require relay lens 122 to provide a flat field.

Color Imaging

The embodiments disclosed with reference to FIGS. 1 through 5 show how images are formed, with different possible arrangements of components. It must be emphasized that there are a number of possible alternative embodiments within the scope of the present invention. There are, for example, a number of ways in which to provide color image sequencing using the apparatus and methods of the present invention. The scanning fiber technique disclosed allows color frames to be provided using interleaved color light beams or using time-sequenced color frames, for example.

Figure 6:
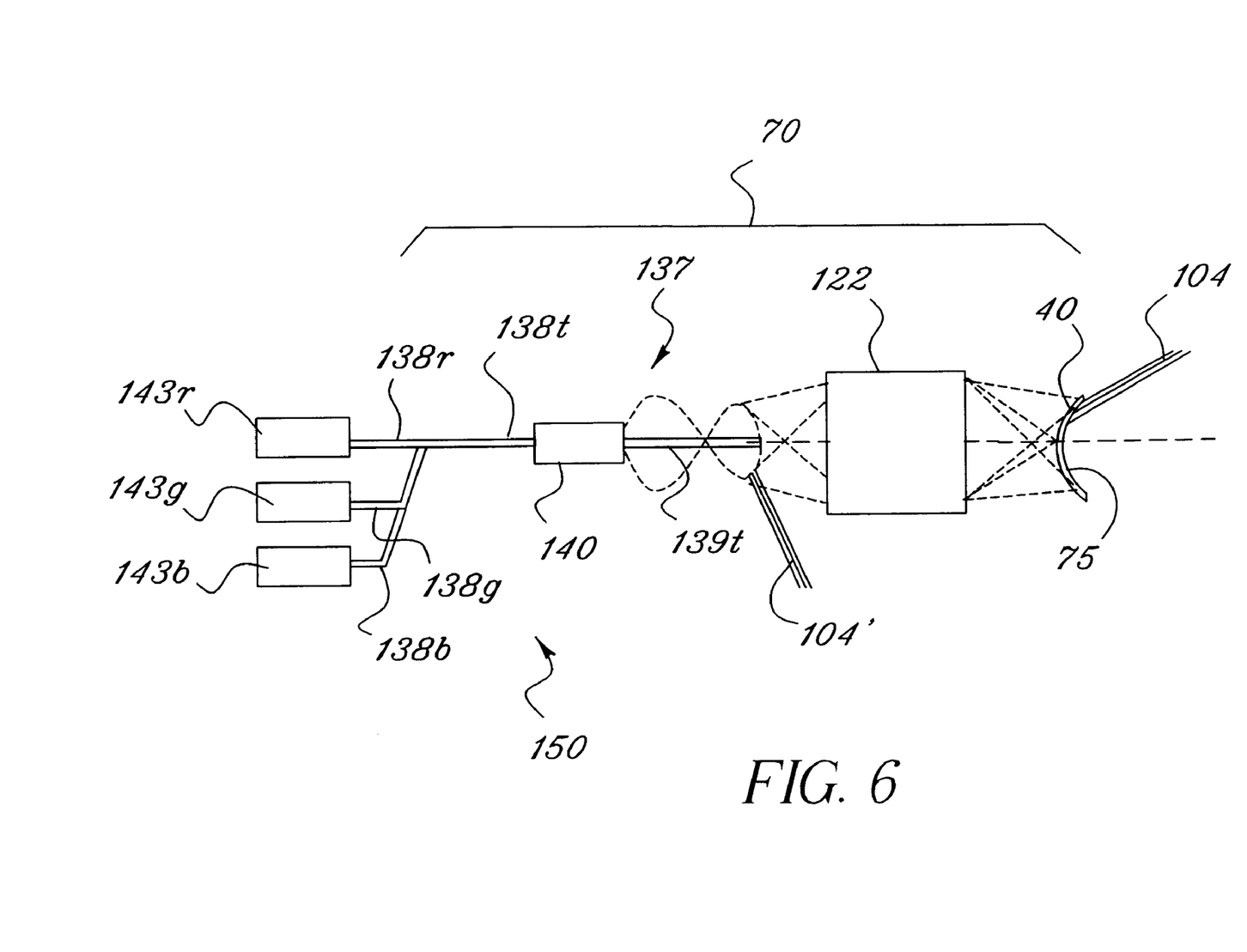
FIG. 6 is a schematic view showing an embodiment of the image generation system of the present invention for color imaging.

Referring to FIG. 6, there is shown a preferred embodiment of image generation system 70 for projection of color images. Red, green, and blue light sources 143r, 143g, and 143b are coupled to a trifurcated fiber assembly 150 which combines the corresponding individual colors from optical fiber, red 138r, optical fiber, green 138g, and optical fiber, blue 138b to provide a multicolor optical fiber 138t. Resonant fiber scanner 137 operates to actuate multicolor resonant cantilever portion 139t in order to form first intermediate curved image 75 as a color image. Red, green, and blue colors are conventionally used for full-color representation; however, alternate sets of two or more colors could be used for forming a multicolor image.

The preferred embodiment of the present invention provides an exceptionally wide field of view and improved brightness for autostereoscopic imaging, with viewing pupil 14 sizes exceeding 20 mm and with minimum right-eye/left-eye crosstalk. Moreover, ball lens assembly 30 provides excellent off-axis performance and allows a wider field of view than with conventional systems, possibly up to 180 degrees. This provides an enhanced viewing experience for observer 12, without requiring that headset, goggles, or other device be worn.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, there are many possible arrangements for supporting projection optics, for color multiplexing and sequencing, and for retro-reflective surfaces that could be used with the substantially monocentric arrangement of components disclosed for this invention.

Thus, what is provided is an apparatus and method for generating left- and right-eye images using a resonant fiber-optic member to form an image, with a monocentric arrangement of optical components, including a retro-reflective surface, to provide a very wide field of view and large viewing pupils.

PARTS LIST

10. Autostereoscopic imaging system
12. Observer
14. Viewing pupil
14l. Left viewing pupil
14r. Right viewing pupil
16. Beamsplitter
30. Ball lens assembly
30l. Left ball lens assembly
30r. Right ball lens assembly
31. Ball lens pupil
31l. Left ball lens pupil
31r. Right ball lens pupil
40. Curved surface
40l. Left curved surface
40r. Right curved surface
42. Meniscus lens
44. Meniscus lens
46. Spherical lens
48. Stop
50. Dispersive point source
68. Human eye pupil
68l. Left human eye pupil
68r. Right human eye pupil
70. Image generation system
70l. Left image generation system
70r. Right image generation system
75. First intermediate curved image
75l. First left intermediate curved image
75r. First right intermediate curved image
104. Image pixel
104'. Scanner pixel
122. Relay lens assembly
124. Retro-reflective surface
137. Resonant fiber scanner
138. Optical fiber
138r. Optical fiber, red
138g. Optical fiber, green
138b. Optical fiber, blue
138t. Multicolor optical fiber
139. Resonant cantilever portion
139t. Multicolor resonant cantilever portion
140. Actuator
141. Light source driver
143. Light source
143r. Red light source
143g. Green light source
143b. Blue light source
150. Trifurcated fiber assembly

What is claimed is:

1. A substantially monocentric autostereoscopic optical apparatus for displaying a stereoscopic real image comprising a left image to be viewed by an observer at a left viewing pupil and a right image to be viewed by the observer at a right viewing pupil, said apparatus comprising:

(a) a left image generation system and, similarly constructed; a right image generation system, wherein each left and right image generation system forms a first intermediate curved image comprising an array of image pixels, with each image generation system comprising:

(a1) a light source for emitting modulated light corresponding to a series of image pixels arranged according to a scan pattern;

(a2) an optical waveguide having an input end coupled to said light source and a flexible output end, said output end emitting said modulated light;

(a3) an actuator for deflecting said flexible output end of said optical waveguide according to said scan pattern;

(a4) a curved surface for forming said first intermediate curved image thereon by receiving said modulated light emitted from said output end of said optical waveguide as deflected by said actuator according to said scan pattern;

(a5) an optical relay element for relaying, onto said curved surface, said modulated light emitted from said flexible output end of said optical waveguide according to said scan pattern, forming said first intermediate curved image thereby;

(b) a left ball lens assembly for projecting said first intermediate curved image from said left image generation system, said left ball lens assembly having a left ball lens pupil;

(c) a right ball lens assembly for projecting said first intermediate curved image from said right image generation system, said right ball lens assembly having a right ball lens pupil;

(d) a retro-reflective surface disposed to form, in cooperation with a beamsplitter, a pseudo-image of said left ball lens pupil at said left viewing pupil and to form a pseudo-image of said right ball lens pupil at said right viewing pupil; and said stereoscopic real image formed on said retro-reflective surface from said first intermediate curved image from said left image generation system and from said first intermediate curved image from said right image generation system.

2. The autostereoscopic optical apparatus of claim 1 wherein said light source is a laser.

3. The autostereoscopic optical apparatus of claim 1 wherein said light source provides red, green, or blue light.

4. The autostereoscopic optical apparatus of claim 1 wherein said scan pattern is rectilinear.

5. The autostereoscopic optical apparatus of claim 1 wherein said scan pattern is spiral.

6. The autostereoscopic optical apparatus of claim 1 wherein said scan pattern is radial.

7. The autostereoscopic optical apparatus of claim 1 wherein said scan pattern comprises concentric circles.

8. The autostereoscopic optical apparatus of claim 1 wherein said optical waveguide comprises an optical fiber.

9. The autostereoscopic optical apparatus of claim 1 wherein said actuator is piezoelectric.

10. The autostereoscopic optical apparatus of claim 1 wherein said actuator is electromagnetic.

11. The autostereoscopic optical apparatus of claim 1 wherein said actuator is electrodynamic.

12. The autostereoscopic optical apparatus of claim 1 wherein said actuator comprises a motor.

13. The autostereoscopic optical apparatus of claim 1 wherein said curved surface comprises a coating.

14. The autostereoscopic optical apparatus of claim 1 wherein said curved surface is ground to provide diffusive characteristics.

15. The autostereoscopic optical apparatus of claim 1 wherein said curved surface is etched to provide diffusive characteristics.

16. The autostereoscopic optical apparatus of claim 1 wherein said optical relay element comprises a fiber optic faceplate.

17. The autostereoscopic optical apparatus of claim 1 wherein, for said left image generation system, said ball lens assembly and said curved surface share, optically, substantially the same center of curvature.

18. The autostereoscopic optical apparatus of claim 1 wherein, for said right image generation system, said ball lens assembly and said curved surface share, optically, substantially the same center of curvature.

19. The autostereoscopic optical apparatus of claim 1 wherein said left ball lens assembly further comprises at least one meniscus lens.

20. The autostereoscopic optical apparatus of claim 1 wherein said right ball lens assembly further comprises at least one meniscus lens.

21. The autostereoscopic optical apparatus of claim 1 wherein said left ball lens assembly comprises a refractive liquid.

22. The autostereoscopic optical apparatus of claim 1 wherein said right ball lens assembly comprises a refractive liquid.

23. The autostereoscopic optical apparatus of claim 1 wherein said left ball lens assembly comprises a plastic lens element.

24. The autostereoscopic optical apparatus of claim 1 wherein said right ball lens assembly comprises a plastic lens element.

25. The autostereoscopic optical apparatus of claim 1 wherein said retro-reflective surface is essentially spherical.

26. A substantially monocentric autostereoscopic optical apparatus for displaying a stereoscopic real image comprising a left image to be viewed by an observer at a left viewing pupil and a right image to be viewed by the observer at a right viewing pupil, said apparatus comprising a left image generation system and, similarly constructed, a right image generation system, with each image generation system comprising:
(a1) a light source for emitting modulated light corresponding to a series of image pixels arranged according to a scan pattern;
(a2) an optical waveguide having an input end coupled to said light source and a flexible output end, said output end emitting said modulated light;
(a3) an actuator for deflecting said flexible output end of said optical waveguide according to said scan pattern; and
(a4) an optical relay element for relaying said modulated light toward a beamsplitter; and
(b) said beamsplitter folding the light path to direct said modulated light to a retro-reflective surface which thereby forms said stereoscopic real image from said left image generation system and from said right image generation system.

27. The autostereoscopic optical apparatus of claim 26 wherein said light source is a laser.

28. The autostereoscopic optical apparatus of claim 26 wherein said light source provides red, green, or blue light.

29. The autostereoscopic optical apparatus of claim 26 wherein said scan pattern is rectilinear.

30. The autostereoscopic optical apparatus of claim 26 wherein said scan pattern is spiral.

31. The autostereoscopic optical apparatus of claim 26 wherein said scan pattern is radial.

32. The autostereoscopic optical apparatus of claim 26 wherein said scan pattern comprises concentric circles.

33. The autostereoscopic optical apparatus of claim 26 wherein said optical waveguide comprises an optical fiber.

34. The autostereoscopic optical apparatus of claim 26 wherein said actuator is piezoelectric.

35. The autostereoscopic optical apparatus of claim 26 wherein said actuator is electromagnetic.

36. The autostereoscopic optical apparatus of claim 26 wherein said actuator is electrodynamic.

37. The autostereoscopic optical apparatus of claim 26 wherein said actuator comprises a motor.

38. The autostereoscopic optical apparatus of claim 26 wherein said optical relay element comprises a fiber optic faceplate.

39. The autostereoscopic optical apparatus of claim 26 wherein said retro-reflective surface is essentially spherical.

40. The autostereoscopic optical apparatus of claim 26 wherein said retro-reflective surface is essentially cylindrical.

41. The autostereoscopic optical apparatus of claim 26 wherein said retro-reflective surface is essentially flat.

42. A method for display of a stereoscopic real image to an observer, the real image comprising a left image to be viewed by the observer at a left viewing pupil and a right image to be viewed by the observer at a right viewing pupil, the method comprising the steps of:
(a) forming a left image onto a retro-reflective surface comprises:
(a1) emitting a left modulated light corresponding to a series of image pixels arranged according to a left scan pattern;
(a2) directing said left modulated light through a left optical waveguide having a left output end for emitting said left modulated light;
(a3) deflecting said left output end according to said left scan pattern;
(a4) projecting said left modulated light emitted from said left output end toward said retro-reflective surface;
(b) forming a right image onto said retro-reflective surface with the steps of:
(b1) emitting a right modulated light corresponding to a series of image pixels arranged according to a right scan pattern;
(b2) directing said right modulated light through a right optical waveguide having a right output end for emitting said right modulated light;

(b3) deflecting said right output end according to said right scan pattern; and (b4) projecting said right modulated light emitted from said right output end toward said retro-reflective surface.

43. The method of claim 42 wherein the step of projecting said left modulated light toward said retro-reflective surface comprises the step of projecting said left modulated light through a left ball lens.

44. The method of claim 42 wherein the step of projecting said right modulated light toward said retro-reflective surface comprises the step of projecting said right modulated light through a right ball lens.

45. The method of claim 42 wherein the step of projecting said left modulated light further comprises the step of forming a left intermediate image onto a left diffusive surface for projection.

46. The method of claim 42 wherein the step of projecting said right modulated light further comprises the step of forming a right intermediate image onto a right diffusive surface for projection.

* * * * *